US011507890B2

(12) United States Patent
Bouillet et al.

(10) Patent No.: US 11,507,890 B2
(45) Date of Patent: Nov. 22, 2022

(54) ENSEMBLE MODEL POLICY GENERATION FOR PREDICTION SYSTEMS

(71) Applicant: INTERNATIONAL BUSINESS MACHINES CORPORATION, Armonk, NY (US)

(72) Inventors: Eric Bouillet, Dublin (IE); Bei Chen, Dublin (IE); Randall L. Cogill, Dublin (IE); Thanh L. Hoang, Kildare (IE); Marco Laumanns, Zurich (CH); William K. Lynch, Limerick (IE); Rahul Nair, Dublin (IE); Pascal Pompey, Nanterre (FR); John Sheehan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

(21) Appl. No.: 15/278,479

(22) Filed: Sep. 28, 2016

(65) Prior Publication Data
US 2018/0089582 A1    Mar. 29, 2018

(51) Int. Cl.
*G06N 20/20*    (2019.01)
*G06N 20/00*    (2019.01)
*G06N 5/00*    (2006.01)

(52) U.S. Cl.
CPC .............. *G06N 20/20* (2019.01); *G06N 5/003* (2013.01); *G06N 20/00* (2019.01)

(58) Field of Classification Search
CPC ......... G06N 20/00; G06N 20/20; G06N 5/003
See application file for complete search history.

(56) References Cited

U.S. PATENT DOCUMENTS

| | | | |
|---|---|---|---|
| 9,069,916 B2 | 6/2015 | Sarma et al. | |
| 10,402,733 B1* | 9/2019 | Li | ............... G06F 9/46 |
| 2005/0131873 A1* | 6/2005 | Fan | ....... G06F 16/2465 |
| 2013/0346351 A1 | 12/2013 | Lin et al. | |
| 2014/0046880 A1 | 2/2014 | Breckenridge et al. | |
| 2015/0347907 A1 | 12/2015 | Mathew et al. | |
| 2016/0275413 A1* | 9/2016 | Shi | .......... G06N 20/00 |
| 2016/0314632 A1* | 10/2016 | Lu | ........... B64D 45/00 |
| 2017/0132528 A1* | 5/2017 | Aslan | ...... G06N 20/00 |
| 2018/0018561 A1* | 1/2018 | Hassan | .... G06N 3/086 |

FOREIGN PATENT DOCUMENTS

WO    WO-2016039805 A1 *    3/2016    ........... G06K 9/6215

OTHER PUBLICATIONS

Symone G. Soares, A Dynamic and On-line Ensemble Regression for Changing Environments Apr. 15, 2015, Science Direct, vol. 42, Issue 6, pp. 2935-2948.*
Liao, An Ensemble Learning Approach for Concept Drift (Year: 2014).*

* cited by examiner

*Primary Examiner* — Abdullah Al Kawsar
*Assistant Examiner* — Tewodros E Mengistu
(74) *Attorney, Agent, or Firm* — Griffiths & Seaton PLLC

(57) ABSTRACT

Embodiments for ensemble policy generation for prediction systems by a processor. Policies are generated and/or derived for a set of ensemble models to predict a plurality of target variables for streaming data such that the plurality of policies enables dynamic adjustment of the prediction system. One or more of the policies are updated according to one or more error states of the set of ensemble models.

6 Claims, 6 Drawing Sheets

ENSEMBLE MODEL POLICY GENERATION FOR PREDICTION SYSTEMS

BACKGROUND OF THE INVENTION

Field of the Invention

The present invention relates in general to computing systems, and more particularly to, various embodiments for ensemble model policy generation for prediction systems using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for ensemble model policy generation for prediction systems by a processor, are provided. In one embodiment, by way of example only, a method for ensemble policy generation for prediction systems, again by a processor, is provided. Policies may be generated or derived for a set of ensemble models to predict a plurality of target variables for streaming data such that the plurality of policies enables dynamic adjustment of the prediction system. One or more of the policies are updated according to one or more error states of the set of ensemble models.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
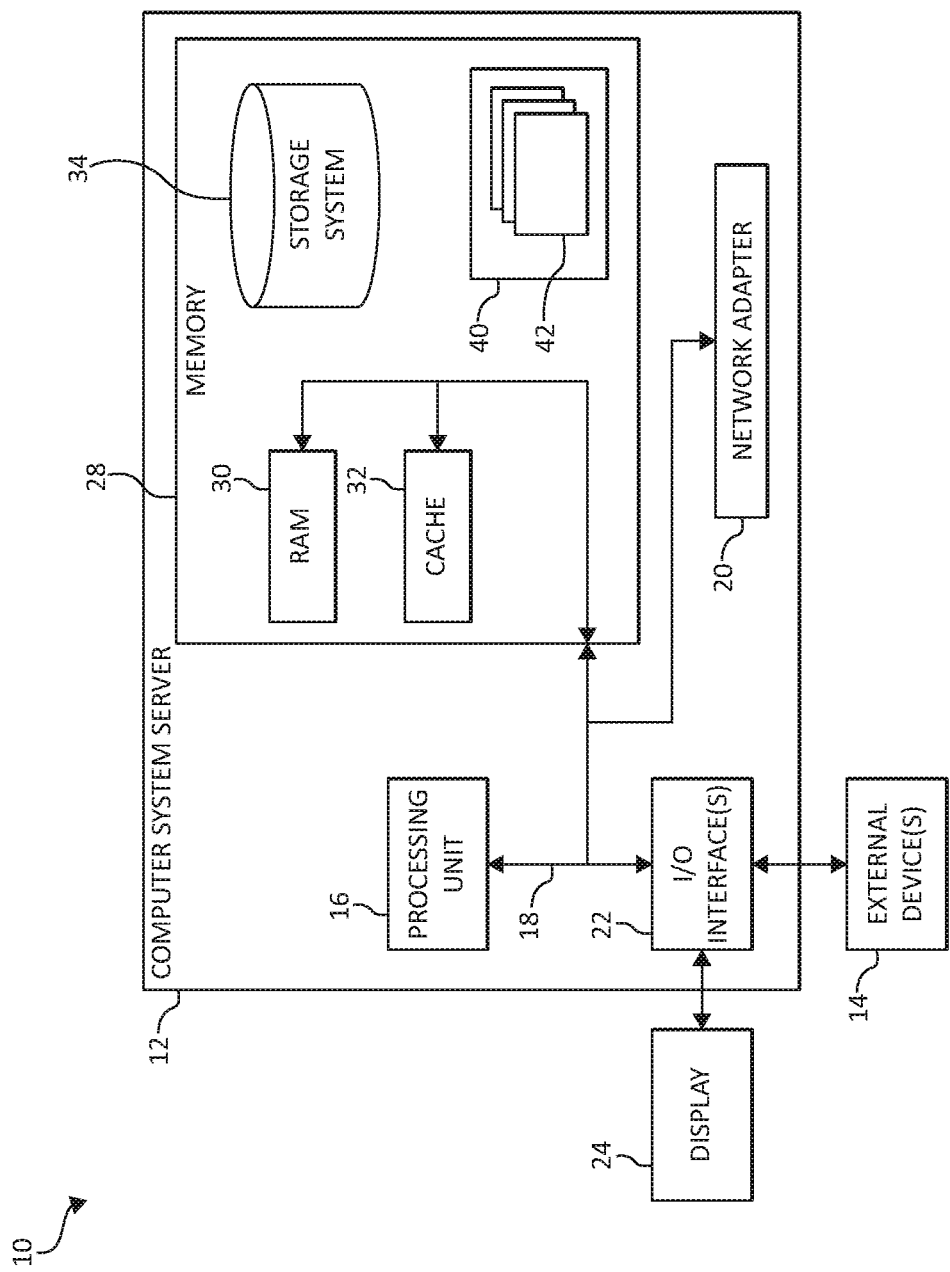
FIG. 1 is a block diagram depicting an exemplary cloud computing node according to an embodiment of the present invention.

The mechanisms of the illustrated embodiments relate to computer automated predictive modeling, and more specifically ensemble policy generation for prediction systems. In one aspect, a prediction model may be used to predict various occurrences. In its simplest form, a prediction model may be based on past behavior to determine future behavior. The process of predictive modeling attempts to predict a most likely outcome for a given starting condition based on a model. Various models can be used in this context, such as the naive Bayes model, the k-nearest neighbor algorithm, logistic regression, etc. A predictive model can use a ground truth set (i.e., a data set comprising members of a known classification) to train a classifier to automatically classify unknown members of an input data set.

In one aspect, the predictive modeling may be employed in large-scale prediction systems (e.g., such as predicting millions of target predictor variables) and may be built based on models built through exploratory analytics on subsets of data, before being deployed for production use. For example, a "template model" may be built that ideally performs, according to a user's expectations, on a data subset and then employ a model management asset to deploy the template model to prediction streams.

However, a current challenge for deployment of a large number of models is model evaluation and refresh evaluation given one or more factors. For example, the factors may include infeasibility of manual inspection and refresh, difficulty in ascertaining causality (e.g., was poor prediction quality of the model a result of a misconfiguration, a special data scenario, concept drift, or "was the designed template model valid for the specific situation?"), the unavailability of compute resources to sample and evaluate all prediction streams, unavailability of all or only a portion of ground truth information, and/or the infeasibility to maintain model versions for specific edge-cases.

The mechanisms of the present invention provide a solution for dynamic adjustment of ensemble models (e.g., predictive models) when a large number of models are used to generate predictions for target variables for streaming data applications. In one aspect, ensemble modeling may be the process of running two or more related, but different prediction or analytical models, and then synthesizing the results into a single score or spread in order to improve the accuracy of predictive analytics and data mining applications. The mechanisms of the embodiments may use available error states for a set of models (e.g., a single model or a partial set of models) to infer policies for the remaining models of the set. In one aspect, one or more policies may be automatically generated to enable dynamic adjustment of a prediction system. Model similarity may be calculated, and a prediction quality may be correlated. The ground truth information may be sampled to generate prediction quality metrics.

The mechanisms of the embodiments provide for ensemble policy generation for prediction systems by a processor. In one embodiment, by way of example only, a method for ensemble policy generation for prediction systems, again by a processor, is provided. Policies may be generated and/or derived for a family of ensemble models (e.g., a set of ensemble models) to predict a plurality of target variables for streaming data such that the plurality of policies enables dynamic adjustment of the prediction system. One or more of the policies may be updated according to one or more error states of the family of ensemble models.

In one aspect, the family of ensemble models may include a set of identical type models and/or a combination of various different types of models. For example, in one aspect, the family of the set of models can include at least a kernel regression model, a random forests model, a macroscopic simulation model (e.g., macroscopic traffic simulation model), and/or a combination thereof. For example, the kernel regression model may estimate a conditional expectation of a random variable. The objective may include locating a non-linear relation between a pair of random variables X and Y. The random forest model may leverage multiple decision trees designed to predict outcomes based on different variables and rules. A random forest model may blend decision trees that may analyze different sample data, evaluate different factors or weight common variables differently. The results of the various decision trees may then either be converted into a simple average or aggregated through further weighting. The macroscopic simulation model may be a traffic simulation model that may deal with a particular type of transportation grid (e.g., roads, railroads, flight patterns, etc.).

Thus, the mechanisms of the embodiments provide a solution to improve the prediction stream of one model based upon a prediction stream of another model in the family of models. For example, assume a family of models includes model 1 and model 2 with over 5 billion predictions per day for train utilization and arrival times in a railroad network. Each model may have complex model requirements. Each train may require specific parameters with the prediction model. A model template may be designed for specific categories and may be deployed across one or more train services. The family of ensemble models may be used to increase performance by reducing bias in the predictions. In one aspect, a model class may be a type of model (e.g., regression, random forest, simulation, etc.). A model may be a specific instance of a model class (e.g., a regression model for category "A"). A model version may be a specific version of a model. An ensemble model may be a model that combines predictions of one or more bases models. A policy may be one or more parameters that may define an ensemble model, such as, for example, what models (e.g., model types or classes) are included in the ensemble model and one or more associated parameters, weights that may be associated with each base model prediction, and which models may be rerun, retained, rebuilt.

For example, model 1 may be used to predict train arrival times for local services and model 2 may be used to predict train arrival times for long-distance services. Assume an unplanned disruption occurs at 8:30 a.m. A local train arrives 30 minutes late at 9:00 am, which results in a prediction error of 30 minutes from model 1 due to the forecasted 8:30 am arrival time without the unplanned disruption. A long-distance train that shares a track with the local train is also scheduled to arrive at 9:30 am. Thus, it is imperative to understand how model 2 should be updated to leverage (partial) information from model 1's prediction error. Also, one or more parameters, conditions, and features may be used, such as, for this example, the delay impact for each classification of train type, use of resources having model similarities (e.g., use of similar tracks, updates to policies to increase weight on simulation-based predictions). Hence, the present invention seeks to provide a solution to improve the prediction stream of one model (e.g., model 2) based upon the prediction stream (e.g., error status of 20 minutes late) of model 1 in the family of models.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
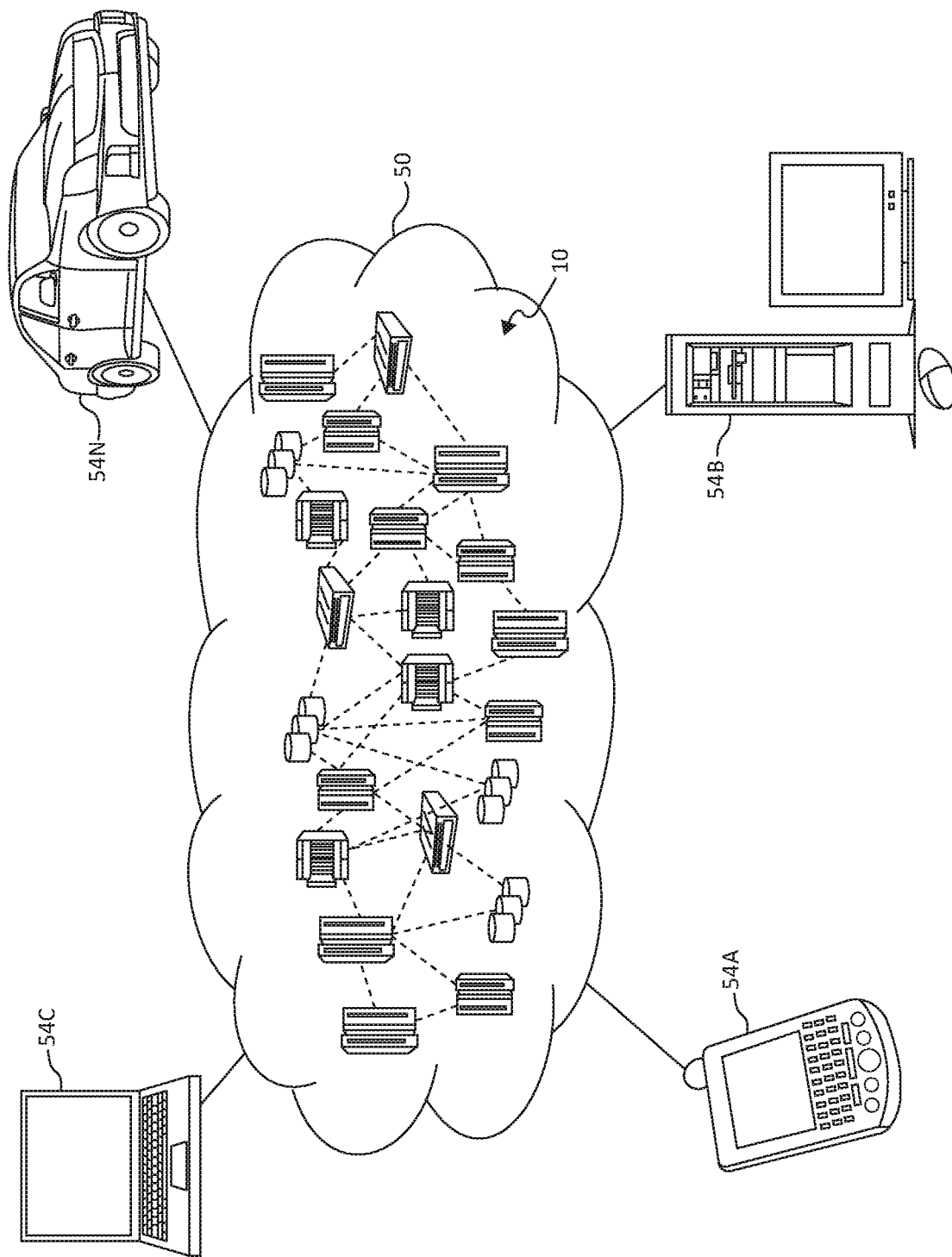
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
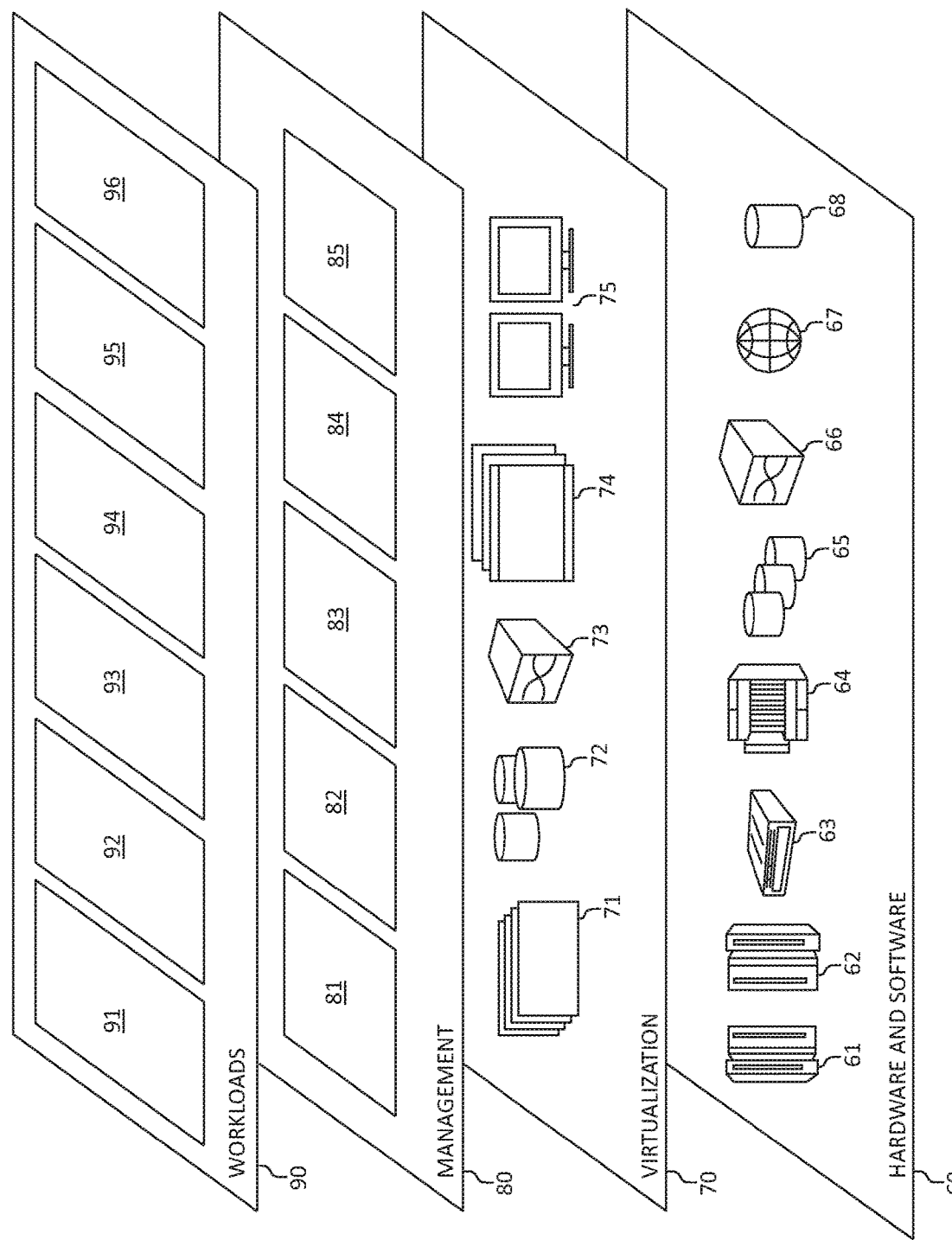
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various ensemble model policy generation workloads and functions 96. In addition, ensemble model policy generation workloads and functions 96 may include such operations as prediction analytics, prediction quality analysis, model prediction stream analysis, and as will be further described, user and device management functions. One of ordinary skill in the art will appreciate that the ensemble model policy generation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the ensemble model policy generation for prediction systems by a processor. In one embodiment, one or more policies may be generated or derived for a set of ensemble models to predict a plurality of target variables for streaming data such that the plurality of policies enables dynamic adjustment of the prediction system. One or more of the policies are updated according to one or more error states of the set of ensemble models.

Figure 4:
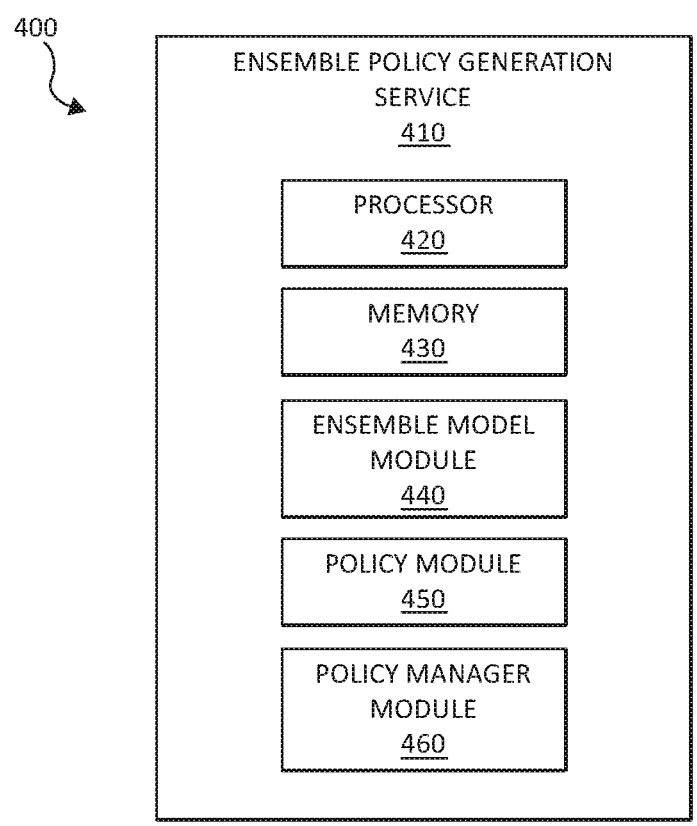
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, one or more of the components, modules, services, applications, and/or functions described in FIGS. 1-3 may be used in FIG. 4. An ensemble model policy generation service 410 is shown, incorporating processing unit 420 to perform various computational, data processing and other functionality in accordance with various aspects of the present invention. The processing unit 420 may be in communication with memory 430. An ensemble model module 440, policy module 450, and a policy manager module 460, are shown.

As one of ordinary skill in the art will appreciate, the depiction of the various functional units in ensemble model policy generation service is for purposes of illustration, as the functional units may be located within an ensemble model policy generation service 410 or elsewhere within and/or between distributed computing components. The policy manager module 460 may include a data repository of policies of one or more ensemble models and/or associated base models of the ensemble model policy generation service 410. The policy manager module 460 may work in concert with processing unit 420 and memory 430 to accomplish various aspects of the present invention, such as, for example deriving a plurality of policies for a set of ensemble models to predict a plurality of target variables for streaming data such that the plurality of policies enables dynamic adjustment of the prediction system, and/or dynamically updates one or more of the plurality of policies according to one or more error states of the set of ensemble models.

The ensemble model module 440 and policy module 450 may each work in concert with processing unit 420 and memory 430 to accomplish various aspects of the present invention. For example, ensemble model module 440 and policy module 450 may undergo various data analytics functions associated with prediction stream of each ensemble module in a family of ensemble modules. As one of ordinary skill in the art will appreciate, the policy manager module 460, the ensemble model module 440, and the policy module 450 may implement mathematical modeling, probability and statistical analysis or modeling, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the various functional units in ensemble model policy generation service for predictive analysis may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models, and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
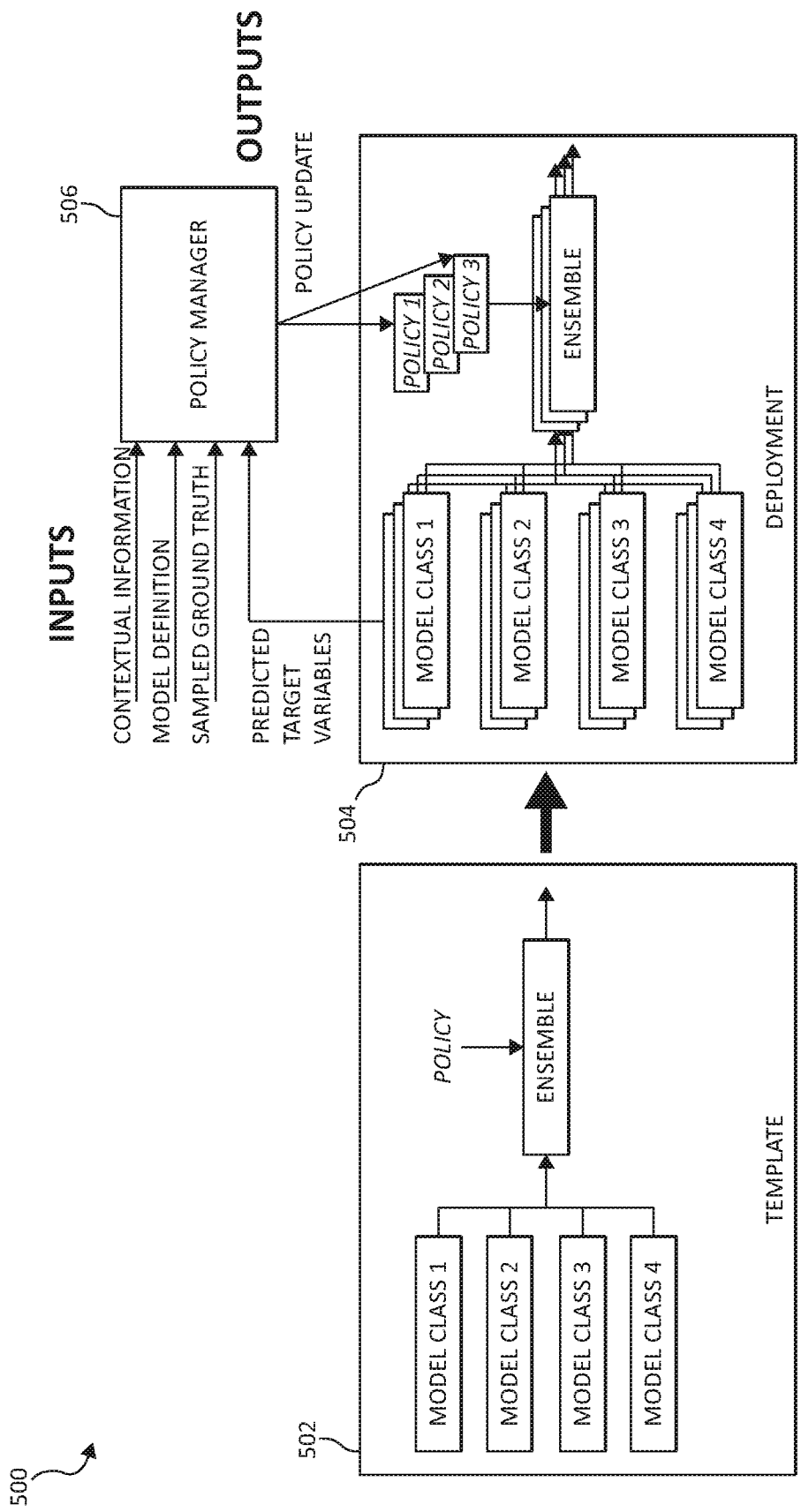
FIG. 5 is an additional block diagram depicting an exemplary functional relationship between various aspects of the present invention.

Turning now to FIG. 5, a block diagram of exemplary functionality 500 relating to ensemble model policy generation is depicted, according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for ensemble model policy generation in accordance with the present invention. Many of the functional blocks 500 may execute as background processes on various components, either in distributed computing components, or on the user device, or elsewhere, and generally unaware to the user performing generalized tasks of ensemble model policy generation.

A template model 502 is shown containing, in the depicted embodiment, model classes 1-4 that are associated with an ensemble model having at least one policy. In conjunction with the deployment model 504 is a depiction of the template model deployed as a deployment model 504. The model classes 1-4 input respective forecast predictions into a family of ensemble models, as indicated in deployment model 504, while also feeding a policy manger 506 with predicted target variables, sampled ground truth data, model definitions, and/or contextual information. Each ensemble model of the family of ensemble models may include at least one policy. Each ensemble model may ingest streaming data from the model classes and output prediction target variables.

The policy manager 506, in communication with each one of the ensemble modules, may include logic to analyze each ingested streaming data received into the ensemble models from the model classes and also analyze the predicated target variables of the ensemble models. The policy manger 506 may identify one or more error states according to each prediction stream of the ensemble models. Thus, the policy manager 506 may derive a plurality of policies for the family of ensemble models to predict a plurality of target variables for the incoming, streaming data such that the plurality of policies enables dynamic adjustment of the prediction system. The policies may be generated according to contextual information, model similarities, model definitions, prediction quality metrics, ground truth data, or a combination thereof. The policy manager 506 may dynamically update one or more of the policies according to one or more error states of the set of ensemble models.

Additionally, the policy manager 506 may include logic to identify model similarity for the set of ensemble models according to prediction accuracy of a plurality of conditions. In a similar fashion, the policy manager 506 may use the model similarities to dynamically adjust the one or more of the plurality of policies for one or more of the ensemble models according to a performance of at least one alternative ensemble model(s), having model similarity features. That is, the policy manager 506 improves the prediction stream of one or more ensemble models based upon a prediction stream of another ensemble model in the family of ensemble models.

In this way, the mechanisms of the embodiment enable dynamic (e.g., real-time) adjustment of the family of ensemble models, provide increased predictive accuracy for target variables, and leverage the most current and available error state information on constituent models to improve the prediction stream of one or more ensemble models based upon a prediction stream of another ensemble model. Error states may be correlated across ensemble models that have substantial similarity (e.g., more likely than not similar or have more similar parameters than non-similar parameters) so to increase efficiency for managing a large family of models with a large number of tunable parameters.

Figure 6:
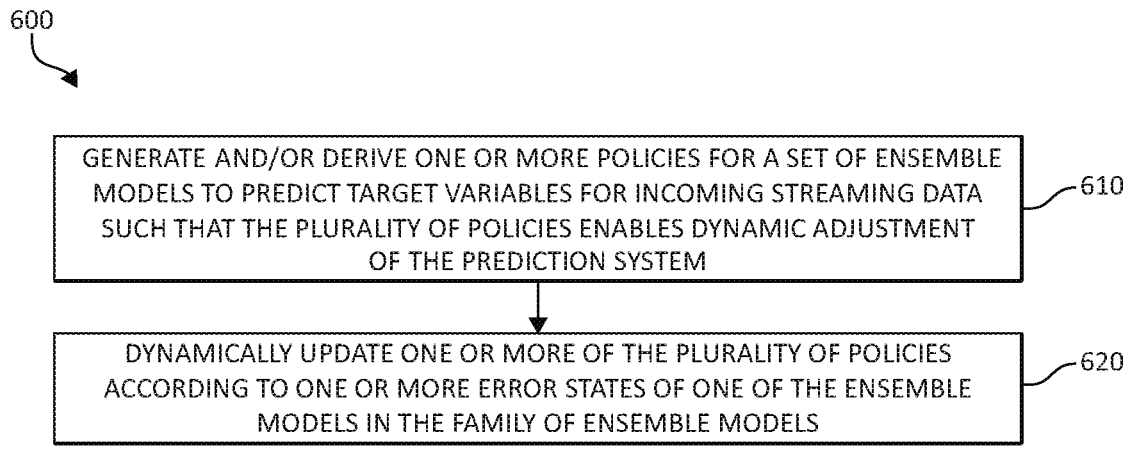
FIG. 6 is a flowchart diagram depicting an exemplary method for ensemble policy generation for prediction systems by a processor, in which aspects of the present invention may be realized.

Turning now to FIG. 6, a method 600 for ensemble model policy generation by a processor is depicted, in which various aspects of the illustrated embodiments may be implemented. That is, FIG. 6 is a flowchart of an additional example method 600 for ensemble model policy generation of a computing environment according to an example of the present technology. The functionality 600 may be implemented as a method executed as instructions on a machine, where the instructions are included on at least one computer readable medium or one non-transitory machine-readable storage medium. Starting in block 610, one or more policies may be generated and/or derived for a set of ensemble models to predict a plurality of target variables for streaming data (e.g., incoming, streaming data from one or more associated base models) such that the plurality of policies enables dynamic adjustment of the prediction system. One or more of the policies may be updated according to one or more error states of the set of ensemble models, as in block 620.

In one aspect, in conjunction with and/or as part of at least one block of FIG. 6, the operations of 600 may include each of the following. The operations of 600 may include generating the plurality of policies according to contextual information, model similarities, ensemble model definitions, prediction quality metrics, ground truth data, or a combination thereof. The operations of 600 may include utilizing the error states for a partial set of the set of ensemble models to dynamical adjust the plurality of policies for a remaining set of the set of ensemble models, identifying model similarity for the set of ensemble models according to prediction accuracy of a plurality of conditions, and/or identifying one or more ensemble models from the set of ensemble models having model similarity based one or more parameters and a plurality of conditions. One or more of the plurality of policies may be dynamically adjusted for a first ensemble model according to a performance of a second ensemble model having model similarity features. The operations of 600 may also include mapping sampled predictive qualities between those of the set of ensemble models having model similarity features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for ensemble policy generation for prediction systems, comprising:
    deriving, by the processor, a plurality of policies for a set of ensemble models to predict a plurality of target variables for streaming data such that the plurality of policies enables dynamic adjustment of the prediction system, wherein the plurality of policies indicate which types of models are to be included in the set of ensemble models, which specific instances of a model class of the types of models for a particular category are to be included in the set of ensemble models, a weight applied to each model in the set of ensemble models, and which models of the set of ensemble models are to be re-executed, retrained, and rebuilt such that the plurality of policies are derived in real-time as the streaming data is received;
    generating, by the processor, the plurality of policies according to contextual information of the streaming data, model similarities, ensemble model definitions, prediction quality metrics, and ground truth data of the set of ensemble models;
    identifying model similarity for the set of ensemble models according to prediction accuracy of a plurality of conditions based on processing of the streaming data;
    wherein one or more error states of those of the set of ensemble models determined to have model similarity parameters over a predetermined threshold are correlated to one or more error states produced by constituent ones of those of the set of ensemble models determined to have the model similarity parameters over the predetermined threshold;
    dynamically updating by the processor, automatically and with no user input, one or more of the plurality of policies according to the one or more error states of the set of ensemble models and a performance of those of the set of ensemble models having the model similarity parameters;
    wherein the error states generated by a first model of the set of ensemble models of a first type is used to the plurality of policies for a second model of the set of ensemble models of a second type different than the first type;
    initially training, by the processor, a classifier of the second model of the set of ensemble models of the second type using the updated one or more of the plurality of policies according to the error states generated by the first model of the set of ensemble models of the first type; and
    predicting, by the processor, the plurality of target variables utilizing the updated one or more of the plurality of policies implemented within the set of ensemble models, wherein the prediction determined by the set of ensemble models is synthesized into a single score and presented via a display interface in communication with the processor.

2. The method of claim 1, further including mapping sampled predictive qualities between those of the set of ensemble models having the model similarity features.

3. A system for ensemble policy generation for prediction systems, comprising:
    one or more computers with executable instructions that when executed cause the system to:
    derive, by a processor associated with the one or more computers and executing the executable instructions, a plurality of policies for a set of ensemble models to predict a plurality of target variables for streaming data such that the plurality of policies enables dynamic adjustment of the prediction system, wherein the plurality of policies indicate which types of models are to be included in the set of ensemble models, which specific instances of a model class of the types of models for a particular category are to be included in the set of ensemble models, a weight applied to each model in the set of ensemble models, and which models of the set of ensemble models are to be re-executed, retrained, and rebuilt such that the plurality of policies are derived in real-time as the streaming data is received;
    generate, by the processor, the plurality of policies according to contextual information of the streaming data, model similarities, ensemble model definitions, prediction quality metrics, and ground truth data of the set of ensemble models;
    identify model similarity for the set of ensemble models according to prediction accuracy of a plurality of conditions based on processing of the streaming data;
    wherein one or more error states of those of the set of ensemble models determined to have model similarity parameters over a predetermined threshold are correlated to one or more error states produced by constituent ones of those of the set of ensemble models determined to have the model similarity parameters over the predetermined threshold;

dynamically update by the processor, automatically and with no user input, one or more of the plurality of policies according to one or more error states of the set of ensemble models and a performance of those of the set of ensemble models having the model similarity parameters;

wherein the error states generated by a first model of the set of ensemble models of a first type is used to dynamically adjust the plurality of policies for a second model of the set of ensemble models of a second type different than the first type;

initially train, by the processor, a classifier of the second model of the set of ensemble models of the second type using the updated one or more of the plurality of policies according to the error states generated by the first model of the set of ensemble models of the first type; and predict, by the processor, the plurality of target variables utilizing the updated one or more of the plurality of policies implemented within the set of ensemble models, wherein the prediction determined by the set of ensemble models is synthesized into a single score and presented via a display interface in communication with the processor.

4. The system of claim 3, wherein the executable instructions sampled predictive qualities between those of the set of ensemble models having the model similarity features.

5. A computer program product for, by a processor, ensemble policy generation for prediction systems, the computer program product comprising a non-transitory computer-readable storage medium having computer-readable program code portions stored therein, the computer-readable program code portions comprising:

an executable portion that derives, by the processor, a plurality of policies for a set of ensemble models to predict a plurality of target variables for streaming data such that the plurality of policies enables dynamic adjustment of the prediction system, wherein the plurality of policies indicate which types of models are to be included in the set of ensemble models, which specific instances of a model class of the types of models for a particular category are to be included in the set of ensemble models, a weight applied to each model in the set of ensemble models, and which models of the set of ensemble models are to be re-executed, retrained, and rebuilt such that the plurality of policies are derived in real-time as the streaming data is received;

an executable portion that generates, by the processor, the plurality of policies according to contextual information of the streaming data, model similarities, ensemble model definitions, prediction quality metrics, and ground truth data of the set of ensemble models;

an executable portion that identifies model similarity for the set of ensemble models according to prediction accuracy of a plurality of conditions based on processing of the streaming data;

wherein one or more error states of those of the set of ensemble models determined to have model similarity parameters over a predetermined threshold are correlated to one or more error states produced by constituent ones of those of the set of ensemble models determined to have the model similarity parameters over the predetermined threshold;

an executable portion that dynamically updates by the processor, automatically and with no user input, one or more of the plurality of policies according to one or more error states of the set of ensemble models and a performance of those of the set of ensemble models having the model similarity parameters;

wherein the error states generated by a first model of the set of ensemble models of a first type is used to dynamically adjust the plurality of policies for a second model of the set of ensemble models of a second type different than the first type;

an executable portion that initially trains, by the processor, a classifier of the second model of the set of ensemble models of the second type using the updated one or more of the plurality of policies according to the error states generated by the first model of the set of ensemble models of the first type; and an executable portion that predicts, by the processor, the plurality of target variables utilizing the updated one or more of the plurality of policies implemented within the set of ensemble models, wherein the prediction determined by the set of ensemble models is synthesized into a single score and presented via a display interface in communication with the processor.

6. The computer program product of claim 5, further including an executable portion that maps sampled predictive qualities between those of the set of ensemble models having the model similarity features.

* * * * *